United States Patent [19]
Dir et al.

[11] Patent Number: 5,193,011
[45] Date of Patent: Mar. 9, 1993

[54] METHOD AND APPARATUS FOR PRODUCING VARIABLE WIDTH PULSES TO PRODUCE AN IMAGE HAVING GRAY LEVELS

[75] Inventors: Gary A. Dir, Fairport; Fred W. Schmidlin, Pittsford; John D. Sotack, Rochester; Joseph F. Stephany, Williamson, all of N.Y.

[73] Assignee: Xerox Corporation, Stamford, Conn.

[21] Appl. No.: 592,468

[22] Filed: Oct. 3, 1990

[51] Int. Cl.⁵ .............................................. H04N 1/23
[52] U.S. Cl. .................................... 358/455; 358/458; 358/460; 358/298; 346/155
[58] Field of Search ............... 358/455, 458, 460, 456, 358/296, 298, 300; 346/153.1, 155, 160.1, 153.1 LED, 153.1 J

[56] References Cited

U.S. PATENT DOCUMENTS

| | | | |
|---|---|---|---|
| 3,681,650 | 8/1972 | Koll | 315/30 |
| 4,605,972 | 8/1986 | Hatanaka | 358/302 |
| 4,777,496 | 10/1988 | Maejima et al. | 346/76 PH |
| 4,800,442 | 1/1989 | Riseman et al. | 358/280 |
| 4,814,796 | 3/1989 | Schmidlin | 346/155 |
| 4,893,190 | 1/1990 | Takanashi et al. | 358/298 |
| 4,905,022 | 2/1990 | Nagasawa | 346/108 |
| 4,989,098 | 1/1991 | Arimoto | 358/455 |
| 5,025,322 | 6/1991 | Ng | 358/298 |

Primary Examiner—Leo H. Boudreau
Assistant Examiner—Andrew W. Johns
Attorney, Agent, or Firm—Finnegan, Henderson, Farabow, Garrett & Dunner

[57] ABSTRACT

A system for printing gray levels without needing to use halftone cells. An architecture is disclosed for controlling printing elements to deposit a variable amount of toner onto a given area of paper. The architecture includes a pixel memory for determining a gray level for each pixel in a row, and a counter for incrementing a gray level. A comparator compares a memory location corresponding to a certain pixel with the output of the counter, and the comparison result is then applied to a printing element corresponding to the pixel.

29 Claims, 13 Drawing Sheets

METHOD AND APPARATUS FOR PRODUCING VARIABLE WIDTH PULSES TO PRODUCE AN IMAGE HAVING GRAY LEVELS

BACKGROUND OF THE INVENTION

1. Field of the Invention

This invention relates an improved system and method for reproducing an image, and more particularly to a system and method of reproducing gray levels in an electrostatic printing apparatus.

2. Description of Related Art

A typical reproduction machine scans and partitions the image to be copied into mutually exclusive areas called "pixels," each having a size corresponding to the spatial sampling resolution of the input section of the reproduction machine. The typical reproduction machine is capable of sensing a range of intensity values for each pixel, 0–16 gray levels for example. The typical reproduction machine output section, however, is capable of printing only a limited number of levels, black and white for example.

If the viewer of a reproduction were presented with only two levels, although the reproduction of text and many line drawings might be adequate, the reproduction of photographs or other images containing gray levels would not be adequate.

FIG. 1 shows a method of presenting gray levels to the viewer in a typical reproduction system. The image to be reproduced is partitioned into multiple mutually exclusive areas called "halftone cells," each containing a number of pixels. The size of the sample area of the input section of the reproduction system corresponds to a halftone cell, while the size of the printing area in the output section of the reproduction system corresponds to a pixel. Gray levels are simulated by turning on a subset of the total number of pixels in a halftone cell. The pixels are too small for the viewer to perceive the printing of individual pixels at a normal viewing distance, and the viewer instead perceives a gray level corresponding to the percentage of pixels that are turned on.

FIG. 1 shows seventeen different halftone cells corresponding to the range of gray levels between black (0) and white (16). To print black, all pixels in the halftone cell are turned on as shown at 105 in FIG. 1. To simulate an intermediate level of gray for the printing of a certain cell, half the pixels might be turned on as shown at level 8 110 in FIG. 1.

A fundamental drawback of the halftone cell technique illustrated in FIG. 1 is a trade-off that exists between number of gray levels and resolution. Since the area of the input sample is not the area of printing resolution, a pixel, but is instead the larger halftone cell area, resolution is reduced. Reducing the size of the halftone cell to include fewer pixels will increase resolution while reducing the number of gray levels.

Compounding the problem of loss of resolution is the nonlinear response of the human eye, which typically requires a compensating bias in the reproduction process. The human eye does not respond linearly to light intensity but instead responds approximately logarithmically. Thus, some of the gray levels implemented in FIG. 1 would not in fact be useful, because the eye would perceive little difference between those levels and the adjacent levels.

SUMMARY OF THE INVENTION

Accordingly, there is needed a technique for printing gray levels without the loss of resolution typically incurred with a halftone cell.

Advantageously, the present invention fulfills that need; and at the same time it can compensate for nonlinearities in the reproduction process.

Briefly, this invention provides for the timed delivery of control signals to a number of printing elements in a reproduction system.

To achieve these and other advantages of the present invention, a gray level reproduction system having a plurality of reproduction elements comprises storing means for storing a plurality of gray level codes, each code corresponding to an area in a row to be printed; addressing means for addressing each gray level code in the storing means; counting means for counting gray levels including means for generating a gray level count; means, coupled to the storing means and to the counting means, for comparing a gray level read from the storing means to the current gray level count generated by the counting means including means for generating an output indicating substantial equality; means, coupled to the comparing means, for accessing each reproduction element; and means for incrementing the counting means after the addressing means has addressed each gray level in the storing means.

To achieve these advantages according to another aspect of the present invention, in a gray level reproduction system having a plurality of reproduction elements, and a first storing means, a method of controlling the reproduction elements, comprising the steps of storing a plurality of gray level codes into the first storing means, each code corresponding to an area in a row to be printed; addressing each gray level code in the first storing means; generating a first clocking signal; counting gray level in response to first clocking signal; comparing a gray level read from the first storing means to the current gray level count counted in response first clock signal; accessing each reproduction element; and executing the counting step after the addressing step has addressed a plurality of gray level codes in the storing means.

DESCRIPTION OF THE PREFERRED EMBODIMENTS

First Preferred Embodiment

Figure 1:
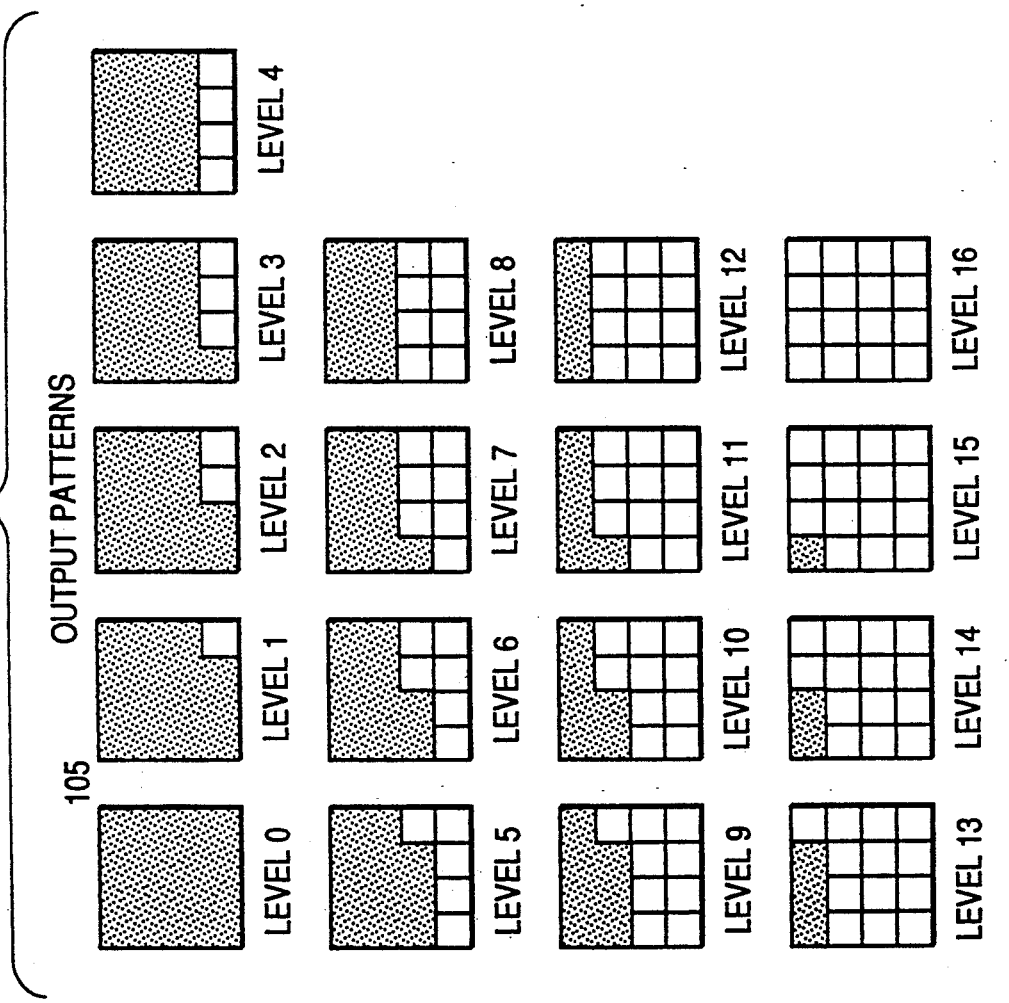
FIG. 1 is a chart of halftone cells according to a prior art technique of presenting gray levels.
Figure 2:
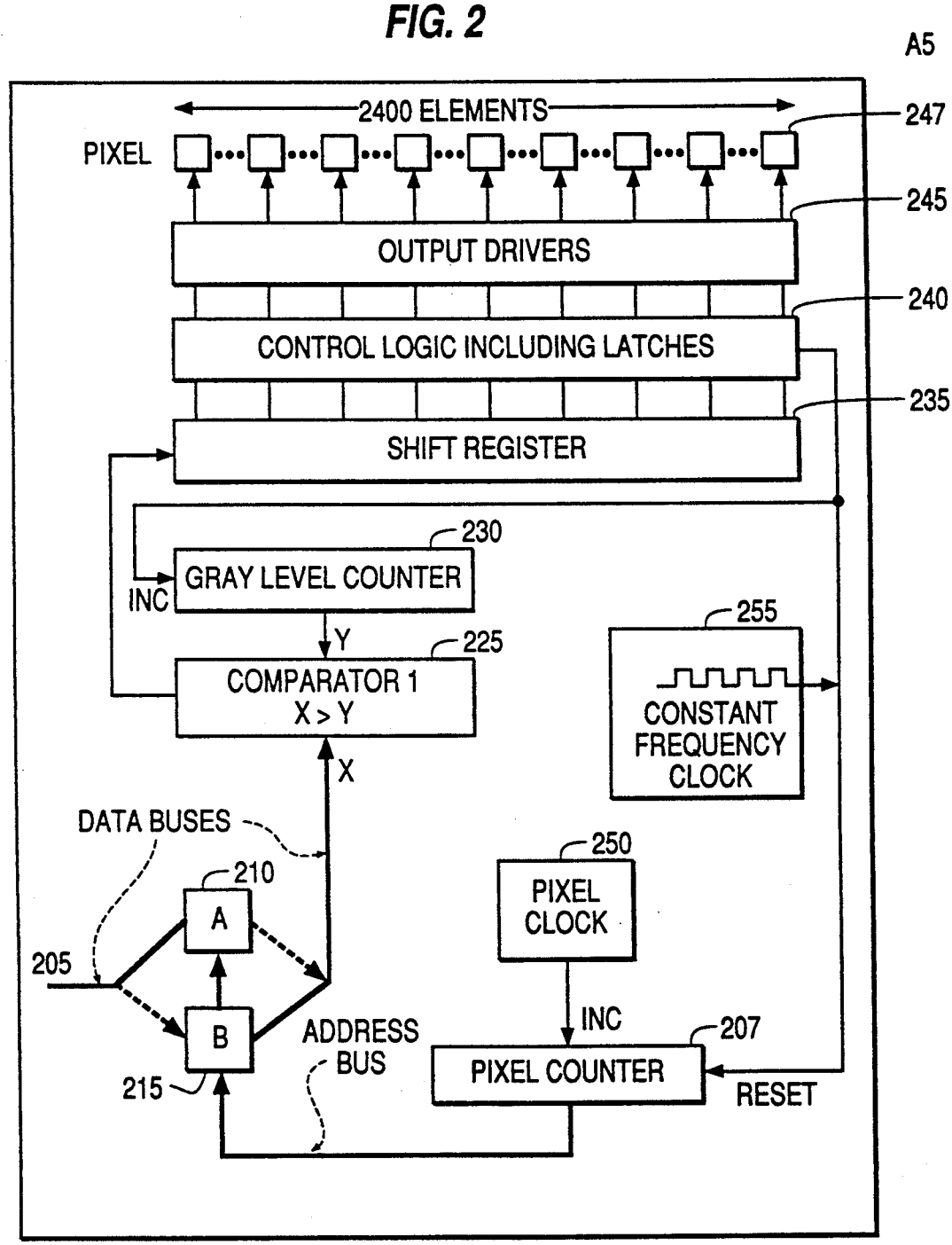
FIG. 2 is a block diagram of gray level printing system according to a first embodiment of the present invention.

FIG. 2 shows a system for printing gray levels according to the first preferred embodiment of the present invention. FIG. 2 includes a means for generating multiple, individually pulse-width-modulated signals that are applied to multiple reproduction elements, respectively.

In FIG. 2, input path 205 originates at a source such as the input section to the reproduction system (not shown). Data from the input path is written alternately into a memory A 210 or a memory B 215. While one memory is being written the other memory is being read. Both memories 210 and 215 hold one row of gray level codes each. Gray level codes read from memory 210 or 215 are applied to the X input of a comparator 225. The output of a gray level counter 230 is applied to the Y input of comparator 225. Comparator 225 generates a 1 when X is greater than Y. Gray level counter 230 is clocked by constant frequency clock 255.

The output of comparator 225 is applied to a shift register 235 that is 2400 elements wide. A parallel output of shift register 235 is applied to a set of latches in control logic 240 which in turn applies an output to output drivers 245. Output drivers 245 drive reproduction elements 247 that are arranged in a 2400 wide array of individually addressable elements.

In the first preferred embodiment, each reproduction element is a direct electrostatic printing (DEP) element. A feature of DEP is that toner or developing material is deposited directly onto a plain (i.e. not specially treated) substrate, such as a sheet of paper, in an image configuration. This type of printing device is disclosed in U.S. Pat. No. 4,814,796 issued Mar. 21, 1989 to Schmidlin, contents of which are herein incorporated by reference. A DEP head prints directly on paper by electrostatic modulation of toner flow through an array of print elements.

Figure 3A:
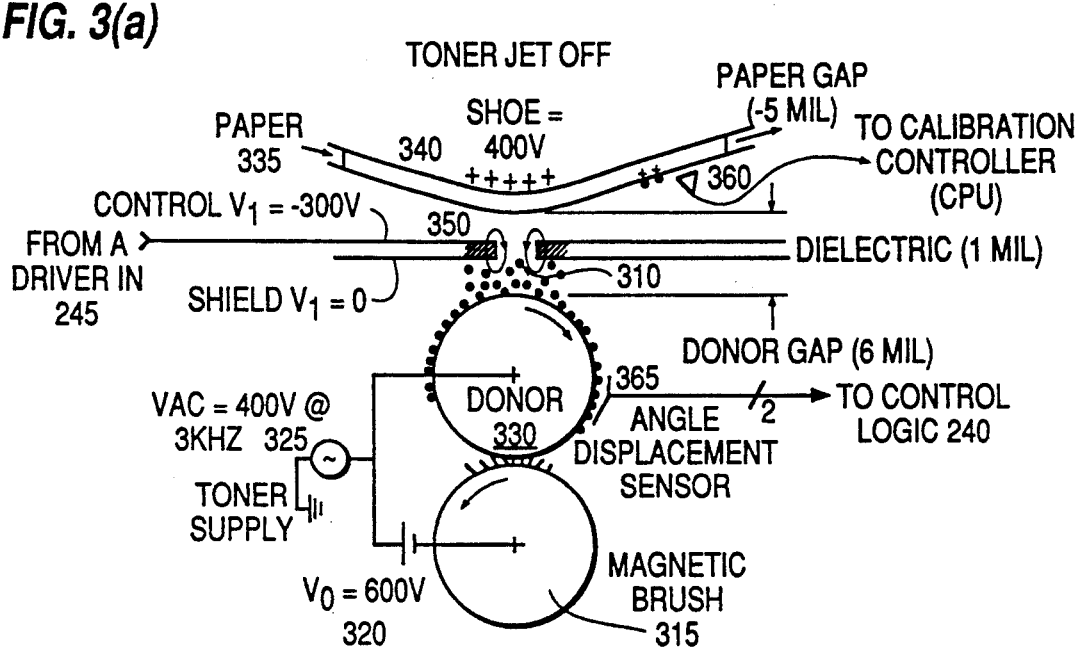
FIG. 3(a) is a schematic diagram of a direct electrostatic printing element in the off-state.
Figure 3B:
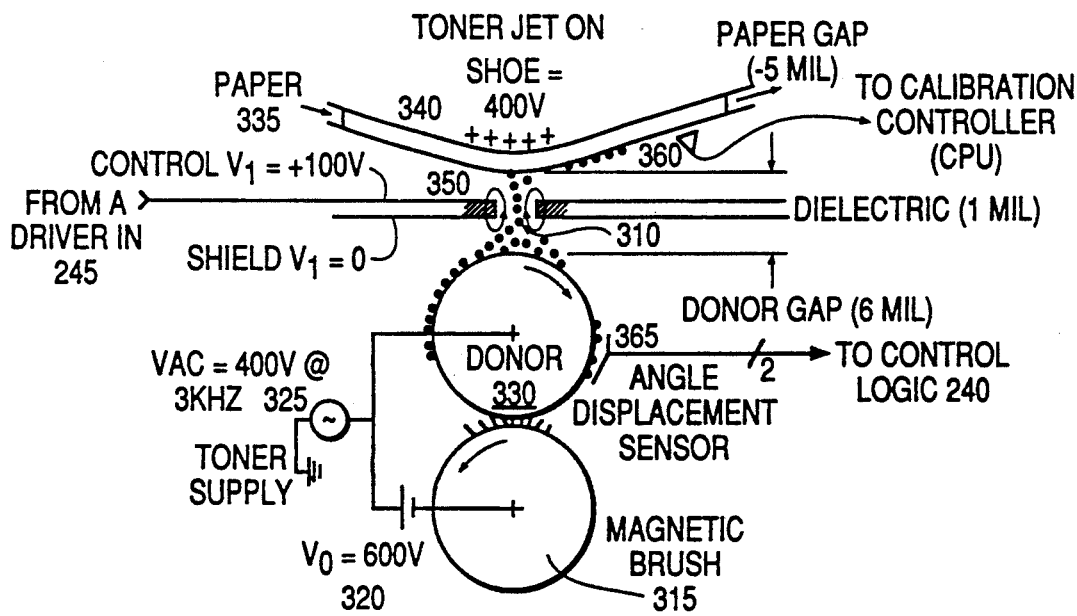
FIG. 3(b) is a schematic diagram of an electrostatic printing element in the on-state.

FIG. 3(a) is a schematic diagram of a single DEP print element in the off state and FIG. 3(b) is a schematic diagram of a single DEP print element in the on state. Each print element includes an aperture 310 opposed to a system for delivering toner from a reservoir to the aperture including a magnetic brush 315 opposed to a reservoir (not shown), bias voltage source 320, an AC voltage source 325, and a donor roll 330. Paper 335 is opposed to the aperture and supported by a positively charged shoe 340. Aperture 310 includes an individually addressable electrode 350. With +100 volts applied to addressable electrode 350, toner is propelled through the aperture associated with the electrode. With −300 volts applied to addressable electrode 350, toner is prevented from being propelled through the aperture. Thus, the aperture is essentially an electrostatic shutter that operates with electric fields instead of moving parts.

Figure 4A:
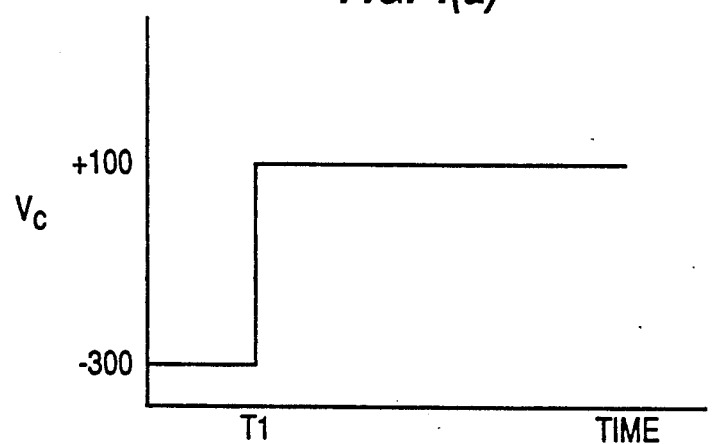
FIGS. 4(a)–4(c) are a series of graphs illustrating nonlinearities in the DEP process.
Figure 4B:
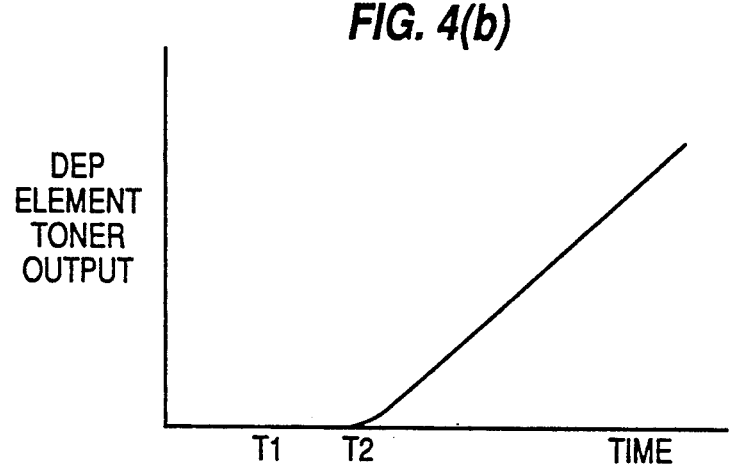

FIG. 4 is a series of graphs, having a common time scale on the horizontal axis, illustrating some nonlinearities in the DEP process. FIG. 4A shows the control voltage on the addressable electrode going from −300 to +100 volts to open the electrostatic shutter to enable toner flow through the DEP aperture. FIG. 4B illustrates that there is a lag between the time that the electrostatic shutter opens and the time that toner flow begins. After the shutter is opened for a certain period of time the amount of toner propelled through the shutter per unit time will be linearly proportional to the amount of time that the shutter is opened a given width, as shown in the time after T2.

Figure 4C:
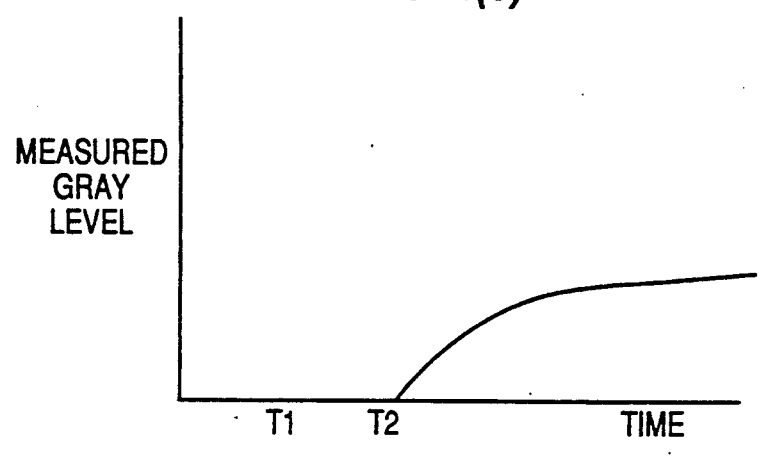

FIG. 4C shows a measured gray level as a function of time. After toner begins to flow the gray level increases until a saturation point is reached where the paper is completely covered by toner.

The 2400 DEP heads correspond to a row on an 8½ inch wide sheet of paper, and allow for a resolution of 282 pixels per inch in the horizontal direction.

Figure 5:
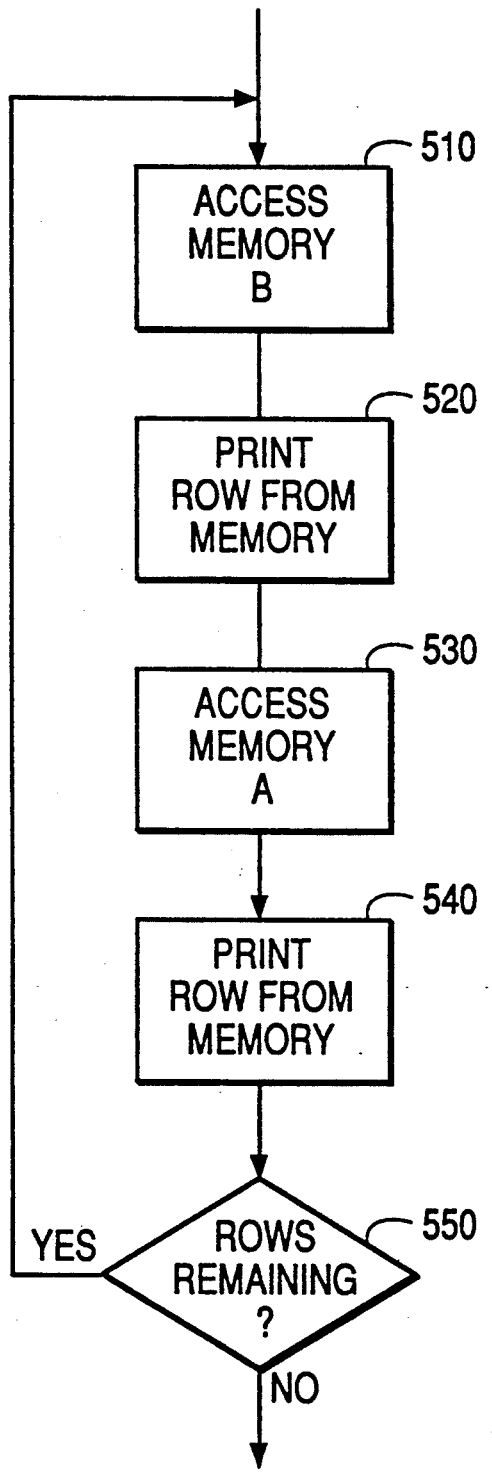
FIG. 5 is a general flow diagram for reproducing an image on a sheet of paper according to the first preferred embodiment of the present invention.

FIG. 5 shows an overview of the flow diagram followed by the system of FIG. 2 to print an image on a sheet of paper. First, memory B 215 is accessed (Step 510), and a row of data is printed on the paper according to the gray level codes stored in memory B 215 (Step 520). Concurrently with step 320, memory A 210 is being filled with the gray level codes for the next row. Next, memory A 210 is accessed (Step 530), and a row of gray level codes stored in memory A 210 is printed (Step 540). A check is performed to determine whether any rows remain to be printed (Step 550), and control passes to Step 510 if rows remain to be printed.

Figure 6:
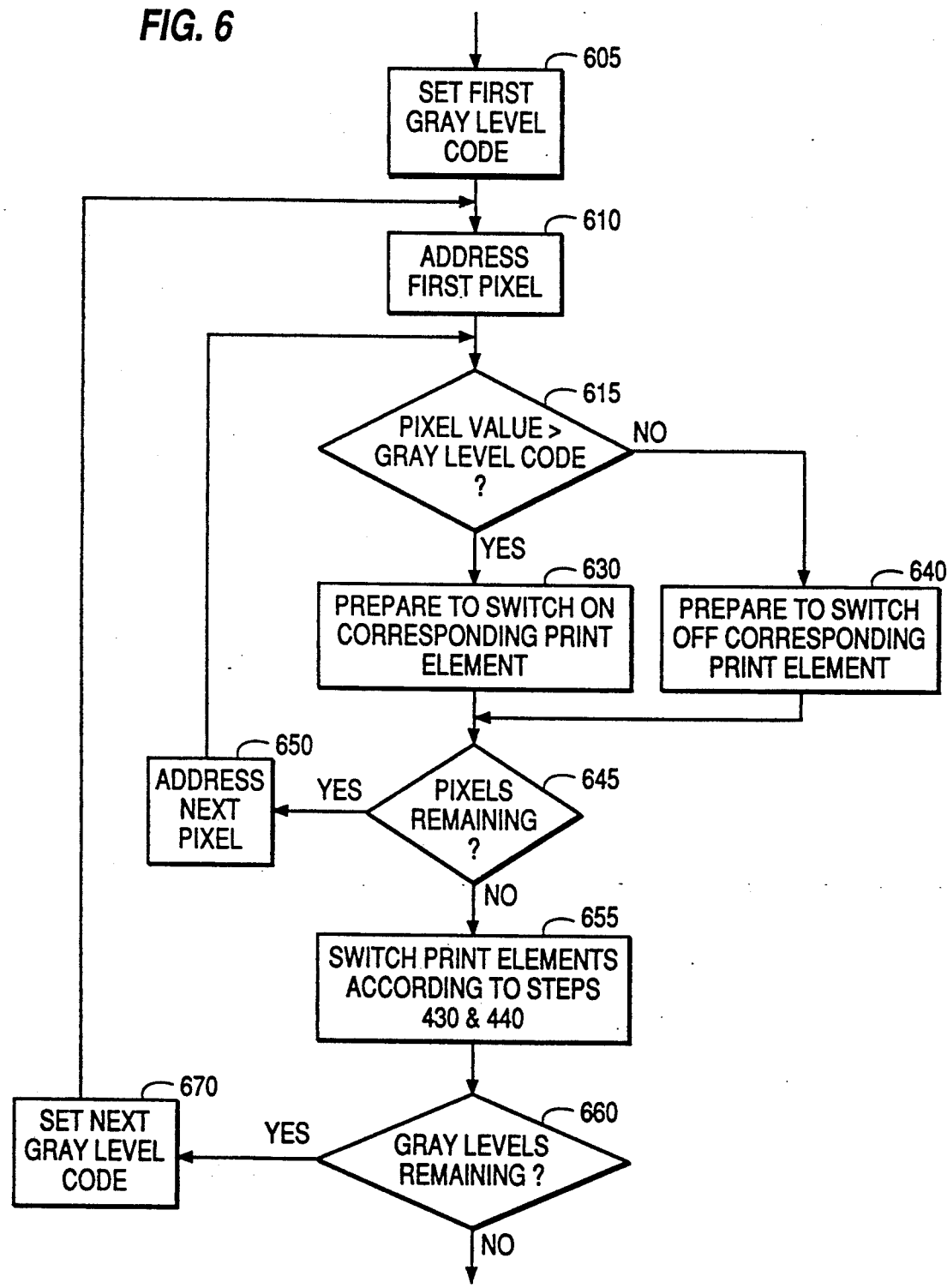
FIG. 6 is a more detailed flow diagram corresponding to two of the steps of FIG. 5.

FIG. 6 shows a flow diagram corresponding to Steps 520 and 540 in FIG. 5, the printing of a row on the sheet of paper. A first gray level code is set (Step 605), and the first gray level code stored in the currently accessed memory is addressed (Step 610). The gray level code is read from the currently addressed location and compared to the currently set gray level value (Step 615). If the read gray level code is greater than the currently set gray level value, prepare to switch on the corresponding print element (Step 630). If the read gray level code is less than equal to the currently set gray level value, prepare to switch off the corresponding print element (Step 640). Preparing to switch a print element on or off corresponds to shifting a bit into shift register 235. A check is performed to determine if any gray level codes remain to be compared to the currently set gray level (Step 645), and the next gray level code is addressed if gray levels remain to be compared (Step 650). If no gray level codes remain to be compared, the print elements are simultaneously switched according to data recorded in steps 630 and 640 (Step 655). Switching the print elements corresponds to parallel loading the latches in control logic 240 from shift register 235. A check is performed to determine if any gray levels remain to be set (Step 660), and the next gray level is set if gray levels remain to be set (Step 670). Control then passes to Step 410 to readdress the first gray level code in the currently accessed memory.

The operation of the system of FIG. 2 to implement the process of FIG. 6 will now be described. At the beginning of a period when a row of data is to be printed, memory B 215 stores the gray level codes for each of the 2,400 pixels while memory A 210 is being filled with gray level codes for the next line. A reset pulse zeros both gray level counter 230 and pixel counter 207 (see Steps 605 and 610). If the current location of MEMORY B, addressed by pixel counter 207 which is now at 0, contains a 23 for example, then a 23 is applied to the X input of comparator 225. Comparator 225 generates a 1 because 23 is greater than 0, and a 0 is being applied to the Y input of comparator 225 from gray level counter 230. Thus, comparator 225 will generate a 1, which is applied to the serial input of shift register 235 (see Step 640). Pixel clock 250 advances pixel counter 207 and shift register 235 (see Step 650). This process continues until 2,400 gray level codes have been read from MEMORY B 215, after which time constant frequency clock 255 increments gray level counter 230 and resets pixel counter 207 (see Steps 670 and 610). This process continues until gray level counter 230 reaches 23, after which time when pixel counter 207 addresses location 0 in MEMORY B 215, comparator 225 will generate a 0, since 23 is not greater than 23, and a 0 will be shifted into shift register 235 for the first pixel (see Step 630).

In the system of FIG. 2 the word size of MEMORY B 215 might be 8 bits, for example. Because constant frequency clock 255 generates a clock signal having a uniform time difference between adjacent edges, the period for printing a row is divided into 256 equal time intervals. MEMORY B 215 is then read 256 times during the time interval for printing a row. If 64 gray levels are required, for example, the 64 gray levels are generated with the sum of a subset of the 256 equal time intervals, as directly determined by the gray level code. Gray level 23 could be selected by, for example, gray level code 54. In the first preferred embodiment, gray level code 54 directly generates 54 equal time intervals.

Figure 7:
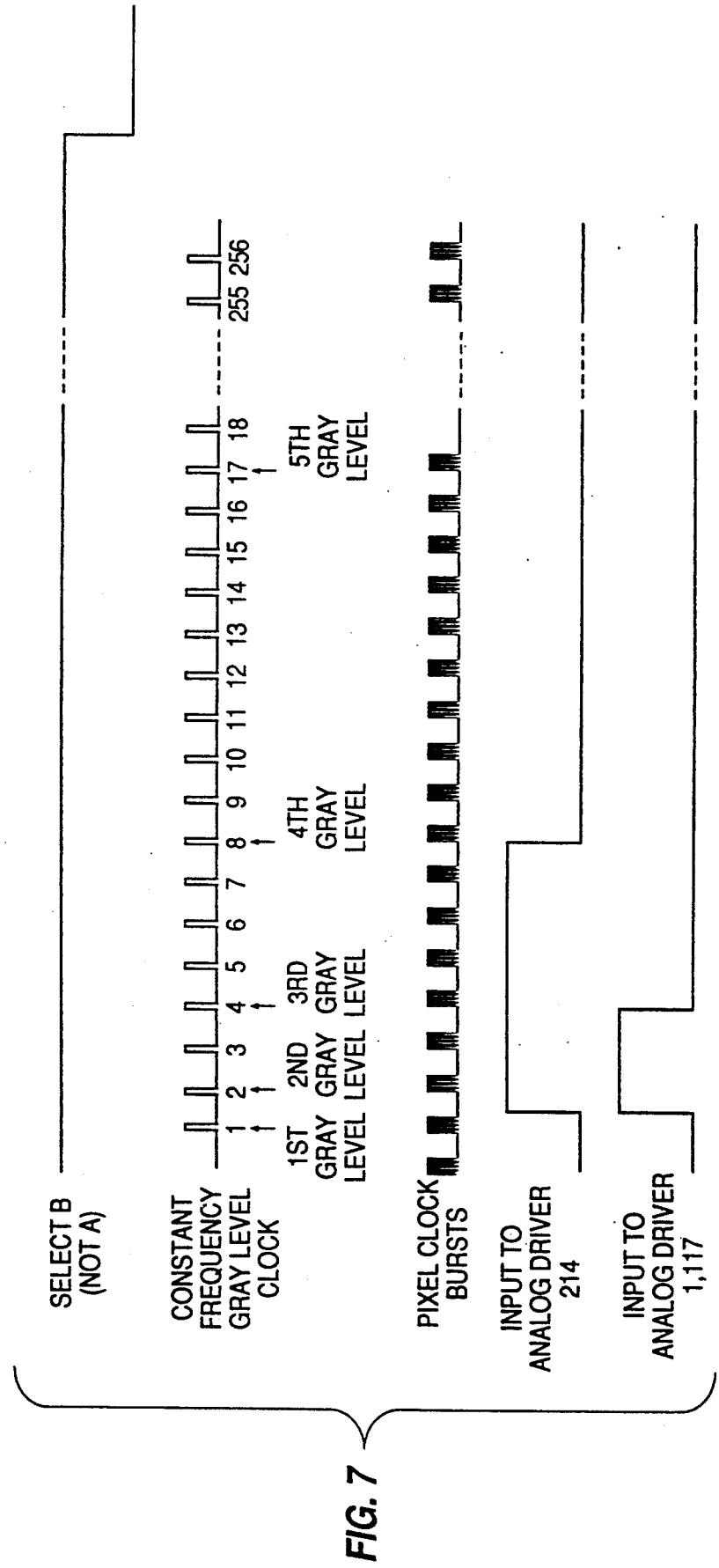
FIG. 7 is a diagram of timing signals according to the first embodiment of the present invention.

FIG. 7 is a diagram of some signals for printing one row of gray levels in accordance with the first preferred embodiment. In FIG. 7, each pixel clock burst consists of 2400 cycles that increment the pixel counter and serially clock data into shift register 235. For purposes of illustration, FIG. 7 shows control inputs for printing element number 214, which is printing the fourth gray level for the row, and for printing element 1,117, which is printing the third gray level for the row.

As discussed earlier, the perception of gray levels by the human eye is nonlinear. FIG. 7 shows the constant frequency gray level clock signal in conjunction with time intervals associated with comparator outputs for five adjacent gray levels for the first preferred embodiment. As can be seen in FIG. 7, the time difference between adjacent gray level is not uniform. This requires that the word size of pixel memories 215 and 210 be sufficiently large to allow for a sufficient number of time intervals to exist on all portions of the input/output curve, which means that there are some portions of the input/output curve where an excessive number of time intervals exist and where pixel memories A 210 and B 215 are used relatively inefficiently.

Second Preferred Embodiment

Figure 8:
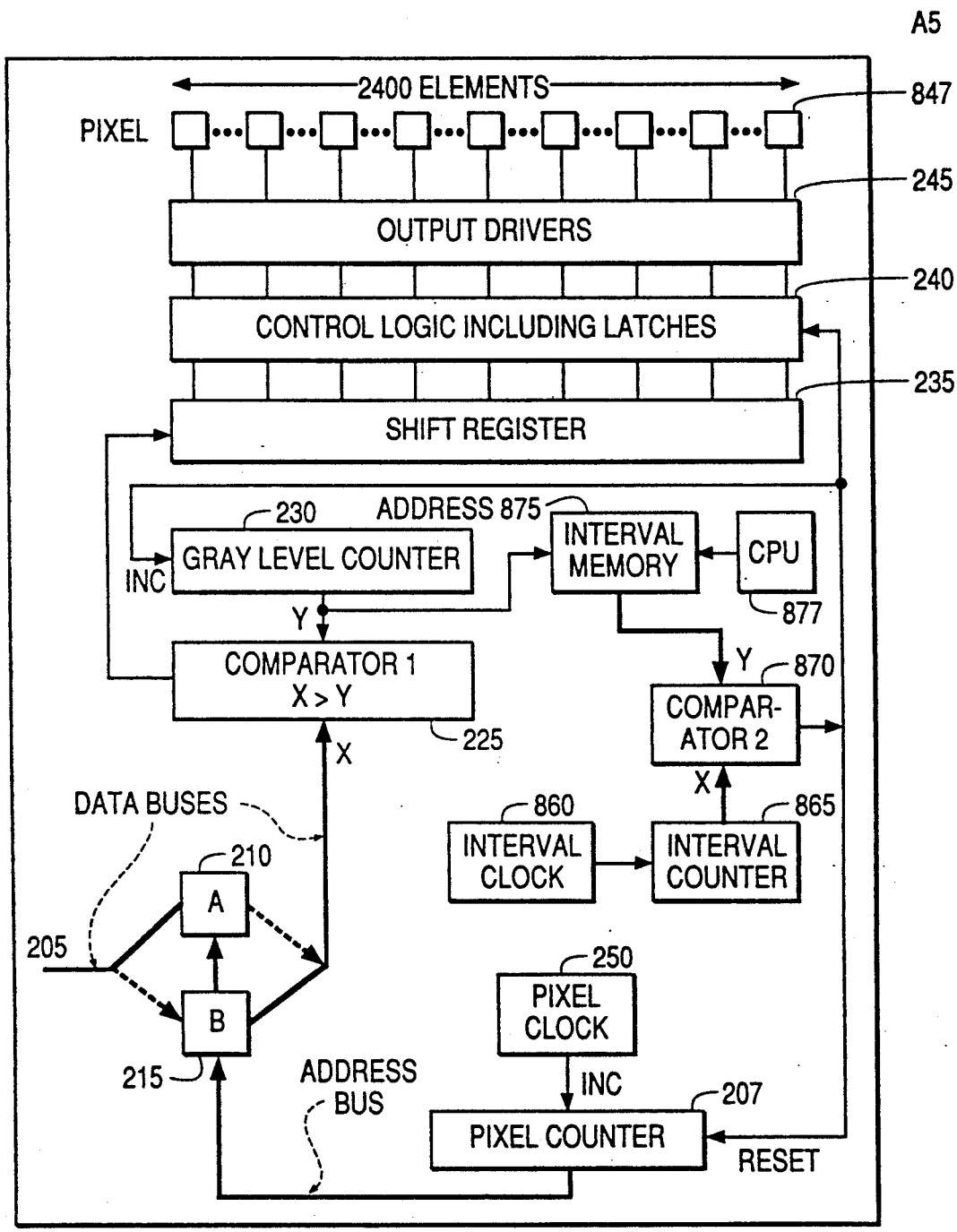
FIG. 8 is a block diagram of a system for printing gray levels according to a second preferred embodiment of the present invention.

FIG. 8 shows a system for printing gray levels according to a second preferred embodiment of the present invention. Components of FIG. 8 corresponding to components of FIG. 2 are labeled with the corresponding reference number.

In the second preferred embodiment, the gray level code does not directly determine the time interval, but is instead used to address a memory in which the time interval corresponding to the gray level code is stored. This memory is part of a structure constituting means for generating a clock signal having a variable time difference between adjacent edges.

In FIG. 8, the gray level clock is generated by components 860-875. Interval clock 860 generates a uniform clock signal that increments interval counter 865, which generates an input which is applied to the X input of comparator 2 870. The Y input of comparator 2 870 is applied with the output of interval memory 875, which is addressed by gray level counter 230.

Interval clock 860 is reset to 0 when gray level counter 230 increments (see Step 670). In the system of FIG. 8, the difference between adjacent gray level codes in pixel memories A 210 and B 215 is uniform, while the difference between the time intervals of adjacent gray level codes is variable because the associated locations in interval memory 875 contain different numbers. Pixel memories A 210 and B 215 require a word size corresponding to the highest gray level code rather than the maximum time interval as is required in the system of the first preferred embodiment shown in FIG. 2. It can be seen that the system of FIG. 8 may have a much greater time resolution than that of FIG. 2, given an equal word size in pixel memories A 210 and B 215. This is because the word size of interval memory 875 can be large as the depth of interval memory 875 need only correspond to the maximum number of gray levels, 64 in this example. The smallest increment of time interval is limited only by the speed of interval counter 865.

Figure 9:
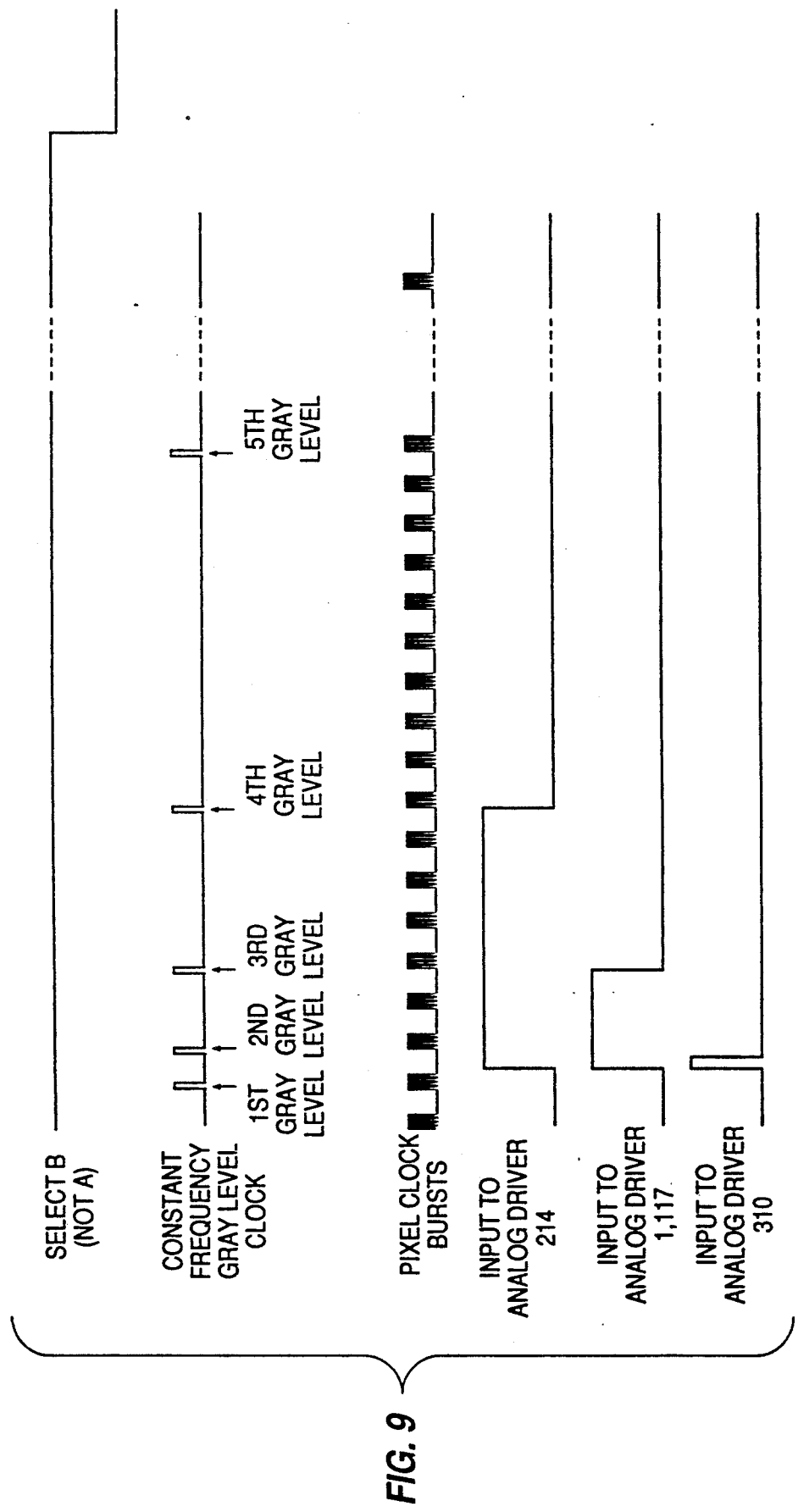
FIG. 9 is a diagram of timing signals corresponding to FIG. 5.

FIG. 9 shows the variable frequency gray level clock signal in conjunction with time intervals associated with comparator outputs for five adjacent gray levels for the first preferred embodiment.

Another difference between the operation of the system of FIG. 8 and that of FIG. 2 is that during the printing of a row shift register 235 is loaded a number times equal to the maximum number of gray levels, rather than the maximum number of time increments as is done in FIG. 2.

Still, another difference between the system of FIG. 8 and that of FIG. 2 is that in FIG. 8, the duration of a gray scale pulse can be shorter than the loading time of shift register 235. This can be achieved through introducing a dead time after the shift register is loaded for the first gray level code thereby attaining a shorter pulse gray scale than the load time of shift register 235. This is illustrated in FIG. 9 where the input to output driver 310 corresponds to printing the first gray level.

Interval memory 875 is loaded in accordance with the result of a calibration process. A CPU 877 writes into interval memory 875 on a trial basis and reads the resulting from a calibration sensor 360 shown in FIG. 3. To determine the interval memory location value corresponding to a certain gray level code, CPU 877 writes a trial value into interval memory 875, a rectangle of approximately ¼ inch vertical dimension is printed using multiple print elements. The rectangle is carried downstream in the paper path and passed under calibration sensor 360 where the intensity value is read and feed back to the CPU. If the intensity is too low after a certain trial, the next trial is conducted with a higher interval memory location value; and, conversely, if the intensity value detected by calibration sensor 360 is too high the next trial is conducted with a lower interval memory location value. This calibration can account for variations in the characteristics of the toner or paper used in the printing process.

The second preferred embodiment also contains a means for compensating for the relative differences between DEP elements. The means for compensating is adjusted in accordance with the output of a highly sensitive sensor used to detect the output each DEP element. The highly sensitive sensor is preferably not a part of the system of the second preferred embodiment because such a sensor, being sensitive enough to measure the output of a single DEP element, would be expensive. Instead, the calibration for compensating for differences between DEP elements is performed at the factory after a DEP head is manufactured, or as part of a field service process.

The means for compensating for relative differences between elements includes a means for each element to have a variable delay between the time that a zero is clocked in from shift register 235 and the time that the control voltage on the associated DEP element is changed to switch the element off. Thus, variations such as variations in the size of the aperture of each element can be compensated.

In addition, because it may be difficult to manufacture the moving parts of the DEP printhead to be exactly symmetrical, the selection of the delay for each element varies with the periodic mechanical motion of the printhead. For example, in the second preferred embodiment donor roll 330 spans across all apertures for a distance of ten inches while having a an average separation distance from each aperture of approximately 1/200 inch. Because the separation distance of donor roll 330 from each aperture may vary as donor roll 300 rotates, donor roll 330 is monitored with an angular displacement sensor 365. Angular sensor 365 senses 4 angular ranges, 0°–90°, 90°–180°, 180°–270°, and 270°–360°. The sensed angular range is sent over a two-bit bus to control logic 240.

Figure 10:
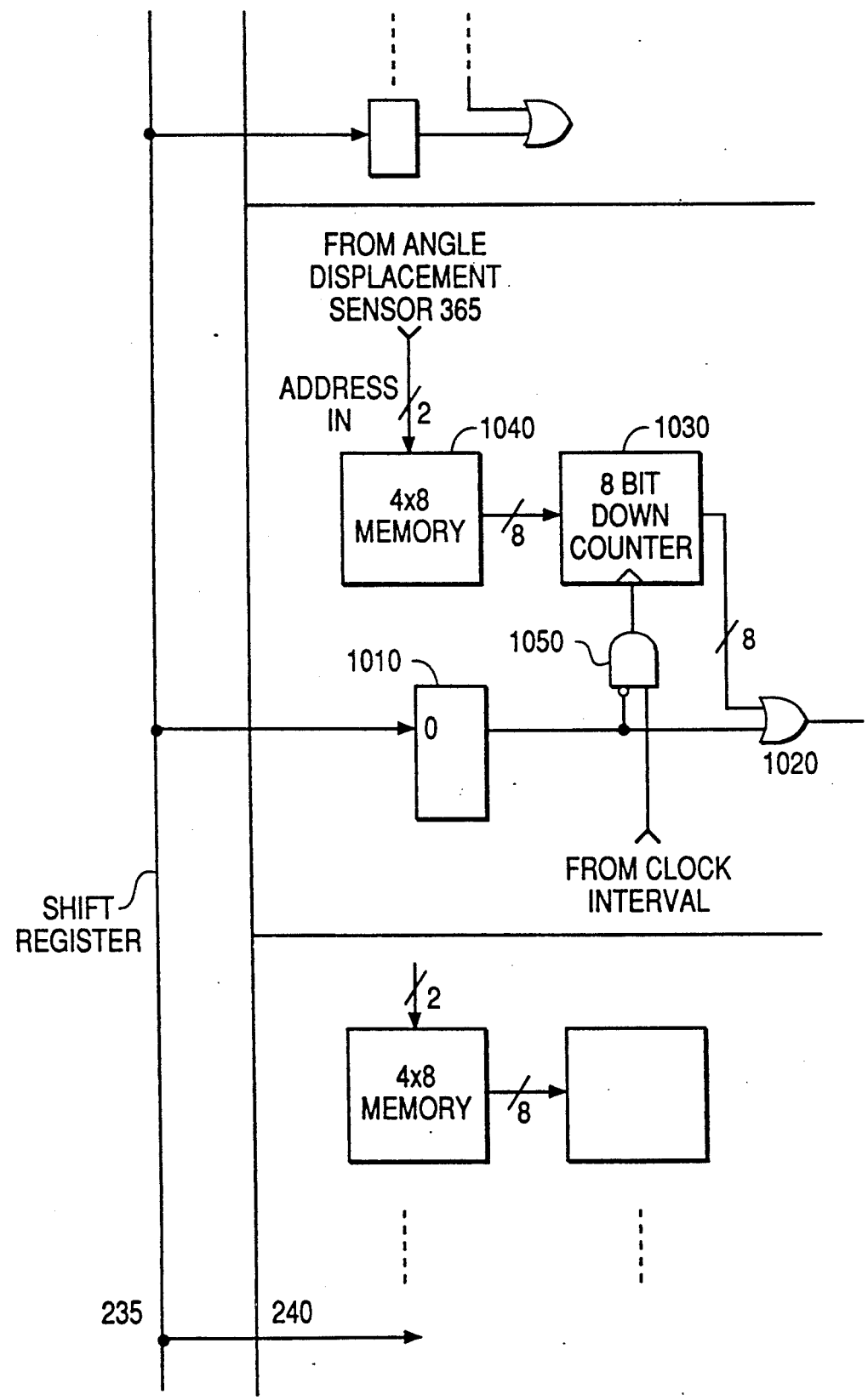
FIG. 10 is a diagram outlining control logic for a DEP element for compensating for relative differences between DEP elements.

FIG. 10 shows some of the control logic corresponding to a single DEP element. Latch 1010 having an output coupled to OR gate 1020 controls whether the corresponding DEP element is on or off. Down counter 1030 is used to introduce a time delay from the time that the output of shift register makes the transition from one to zero and the time that the control signal for the corresponding DEP element changes. Note that down counter 1030 is clocked with the interval clock, a clock having a higher frequency than the clock that increments the gray level counter. Memory 1040 contains 4 different values corresponding to the 4 angular ranges of toner roll 330. One of the 4 values is loaded into down counter 1030 at the beginning of the printing of a row. Each DEP element has its own set of 4 values in its own 4×8 memory. As described earlier, the 4 values are determined during the results of a calibration process to compensate for differences between each DEP element.

Third Preferred Embodiment

Figure 11:
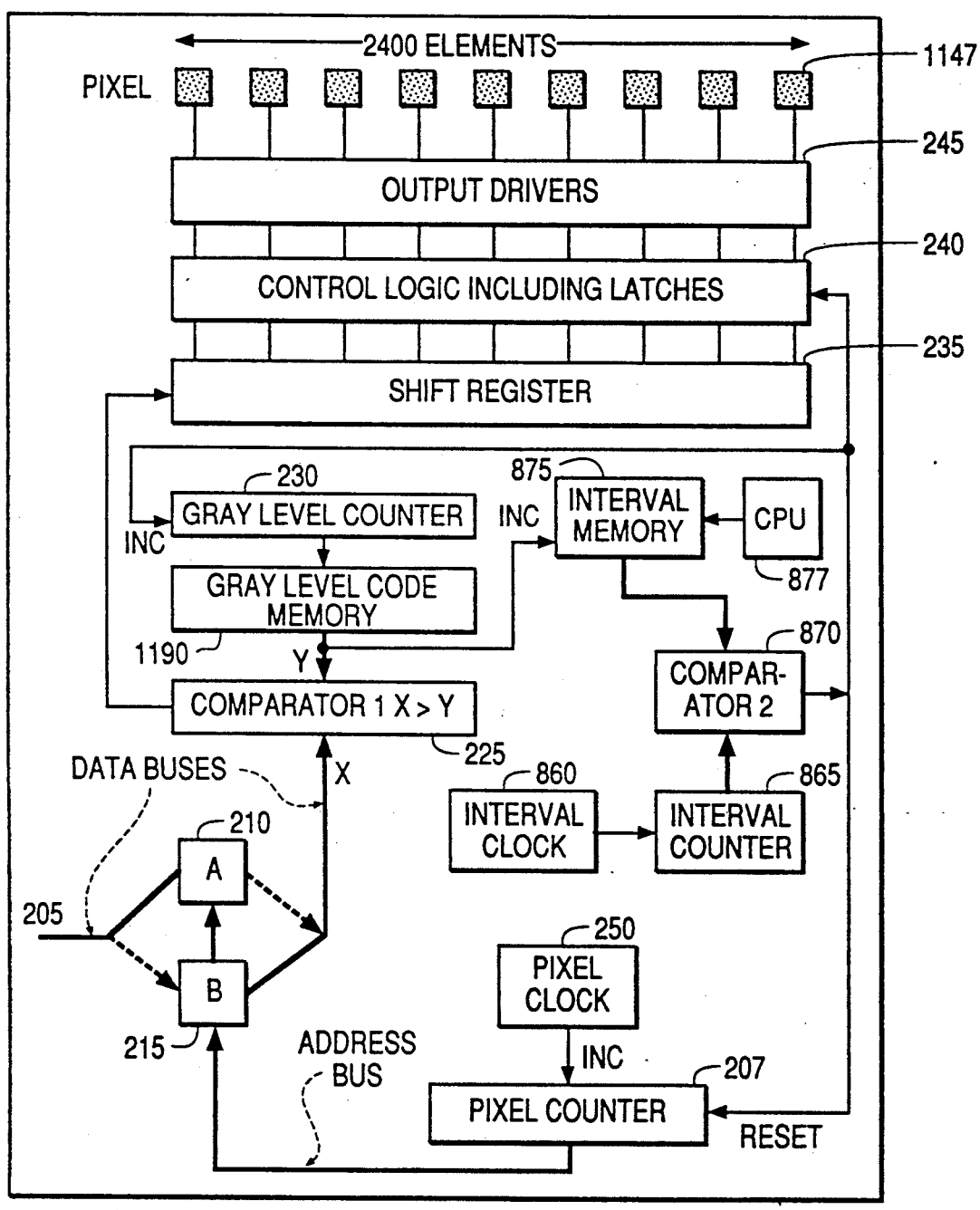
FIG. 11 is a block diagram of a system for printing gray levels according to a third embodiment of the present invention.

FIG. 11 shows a system for printing gray levels according to a third preferred embodiment of the present invention. Components of FIG. 11 corresponding to components of FIG. 8 are designated with corresponding numbers.

One difference between the third preferred embodiment and the second preferred embodiment is that in the third preferred embodiment the direct electrostatic printing (DEP) process is not employed. Instead, the third preferred embodiment employs the widely used process wherein latent electrostatic images formed on a charge retentive surface are developed by a suitable toner material to render the images visible, the images being subsequently transferred to plain paper. In the third preferred embodiment, reproduction elements 1147 are liquid crystal shutters. The liquid crystal shutters are configured between a light source and a photoconductive drum (not shown), and effect a pattern of charge on the drum. Instead of a liquid crystal shutter between a light source, another light generating element such as a light emitting diode may be employed. Charged toner is attracted to the drum according to the pattern of charge on the drum, and the drum is then contacted with a sheet of paper to produce an image on the paper.

Figure 12:
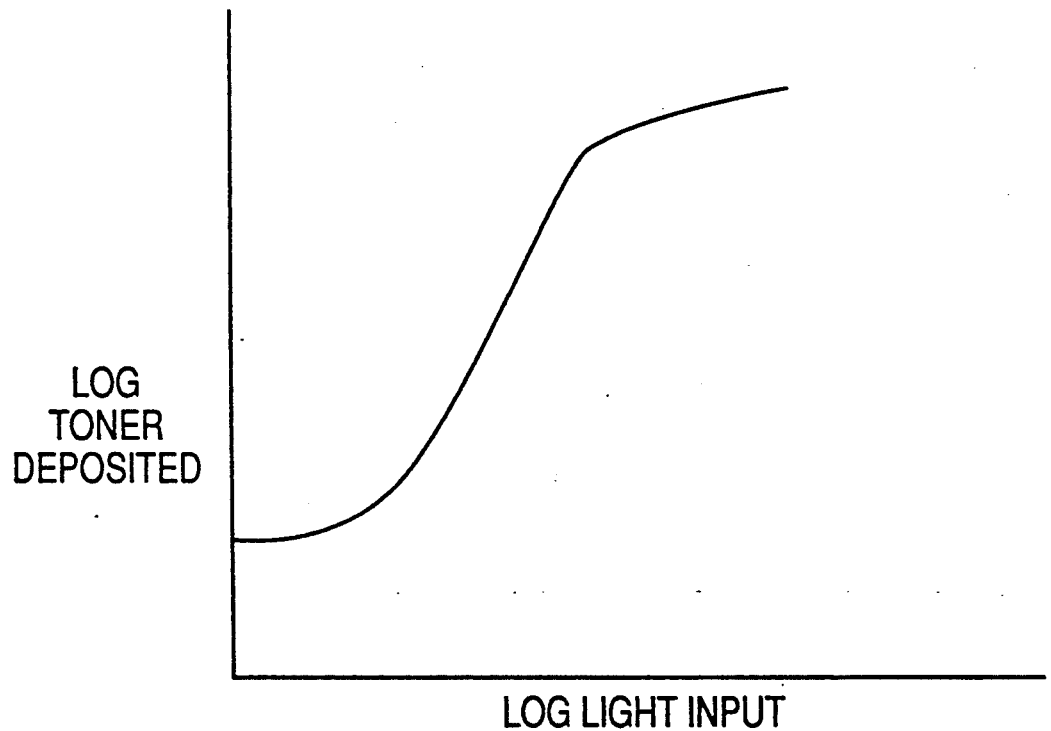
FIG. 12 is a curve showing the transfer characteristics of a developable latent image process.

In the developable latent image process of the third preferred embodiment, the amount of toner applied to the paper is not proportional to the amount of time that the liquid crystal shutter is on. This can be contrasted with the DEP process where, after the lag time described earlier, the amount of toner delivered to the paper is proportional to the amount of time that the DEP head aperture is open a given amount. FIG. 12 represents an input/output characteristic of the latent image process of the second preferred embodiment. In FIG. 12, the curve has a linear portion but also has saturation and cut-off points at each end of the curve respectively.

Figure 13:
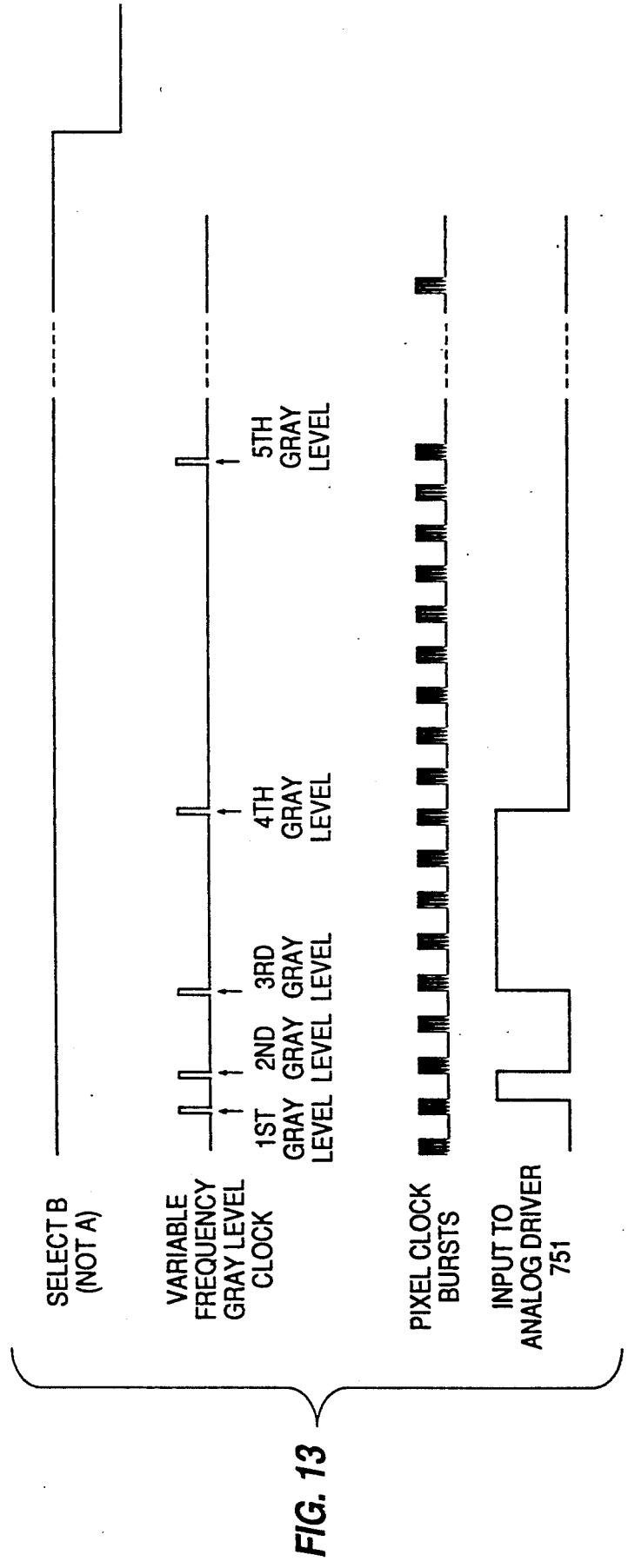
FIG. 13 shows timing signals corresponding to the third embodiment of the present invention.

One difference between the system of FIG. 11 and that of FIG. 8 is that in FIG. 11 the output of gray level counter 230 is applied to a gray level code memory 1190, instead of being directly applied to comparator 225. Gray level code memory 1190 is effectively a means for translating from one time interval to another. During the printing of a row, the series of values applied to the Y input of comparator 1 is not necessarily monotonically increasing. Thus, the effect of this translating is to allow each print element to toggle on and off multiple times during the printing of a row, as illustrated in FIG. 13 where element 751 is being switch toggled twice. The purpose of this toggling is to spread out the light pulses on the photoconductive drum creating increased adhesion of toner particles giving a greater dot density.

CONCLUSION

Thus, the present system for printing gray levels, in all its embodiments, allows for the actual printing of gray levels without any necessary reduction in resolution incurred with the use of halftone cells.

Additional advantages and modifications will occur to those skilled in the art. The invention in its broader aspects is therefore not limited to specific details of the representative system and illustrative examples shown and described. Accordingly departures and optimizations may be made from such details without departing from the spirit or the scope of applicants' general inventive concept. For example, it is possible to have a comparator for each printing element to load a corresponding latch for the printing element, instead of serially loading shift register 235. This modification has the advantage that the data rate to the image bar is reduced, as the image bar need only be loaded with the gray level codes once for each row. The output of the gray level counter would then be bussed to each comparator of the print bar.

The first preferred embodiment, having the DEP electrostatic shutters could be modified to only open the shutter a fractional amount depending on the gray level.

U.S. Pat. No. 4,814,796 suggests that the amount of toner propelled through the aperture per unit time can be varied by adjusting the voltage on the control electrodes between 0 and −350 volts.

In this variation of the first preferred embodiment the voltages applied to each shutter could be a ramp controlled by data in a corresponding latch in control logic 240, which originated at the output of comparator 225.

The first embodiment could be augmented with a means for compensating for relative differences between the printing elements, similar to the means provided for the second embodiment. If an architecture such as the one described in FIG. 10 were to be adapted to the first embodiment, it would be desirable that the downcounter be clocked with a clock having a higher frequency than that of the clock that increments the gray level counter.

Any of the above embodiments and variations can be combined with half tones to obtain a still larger number of gray levels. In addition, with smaller toner particles a proportionally larger number of gray levels are possible, both because a larger number of subdivisions is possible and because the inherent noise level is reduced.

Thus, it will be further apparent to those skilled in the art that various modifications and variations can be made to the instant invention without departing from the scope or spirit of the invention and it is intended that the present invention cover modifications and variations provided they come within the scope of the appended claims and their equivalents.

What is claimed is:

1. A gray level reproduction system having a plurality of reproduction elements comprising:
   first storing means for storing a plurality of gray level codes, each code corresponding to an area in a row to be printed;
   addressing means for addressing each gray level code in the first storing means;
   first clocking means, including means for generating a series of edges having a variable time difference between adjacent edges;
   first counting means, coupled to the first clocking means, for counting gray levels;
   first comparing means, coupled to the first storing means and to the first counting means for comparing a gray level read from the first storing means to the current gray level count generated by the first counting means including means for generating an output indicating equality;
   means, coupled to the first comparing means, for accessing each reproduction element; and
   means for incrementing the first counting means after the addressing means has addressed a plurality of gray level codes in the first storing means.

2. The system according to claim 1, wherein the means for generating a series of edges having a variable time difference between adjacent edges includes
   an interval memory having an address input coupled to the output of the first counting means including means for generating a first interval count;
   second clocking means for generating a clock having a uniform time difference between adjacent rising edges;
   second counting means, coupled to the second clocking means, including means for generating a second interval count;
   second comparing means, coupled to the interval memory and to the second counting means, for comparing the output of the interval memory to the output of the second counting means including means for generating a signal indicating that the first interval count is equal to the second interval count.

3. The system according to claim 2, further including
   a paper path having a section opposed to the reproduction elements and a section downstream from the reproduction elements;
   sensor means, opposed to the paper path at the section downstream from the reproduction elements, for detecting reflectivity of an area corresponding to multiple reproduction elements;
   means, coupled to the sensor means, for writing values into the interval memory.

4. The apparatus according to claim 2, wherein the system further includes
   means, coupled to the first comparing means, for generating a voltage ramp, and the reproduction element includes
   means, coupled to the voltage ramp generating means, for directly depositing toner by direct electrostatic deposition.

5. The apparatus according to claims 1 or 2, wherein a reproduction element includes a liquid crystal shutter.

6. The apparatus according to either of claims 1 or 2, wherein the reproduction element includes a means for directly depositing toner by direct electrostatic deposition.

7. A gray level reproduction system having a plurality of reproduction elements comprising:
   first storing means for storing a plurality of gray level codes, each code corresponding to an area in a row to be printed;
   addressing means for addressing each gray level code in the first storing means;
   first clocking means;
   first counting means, coupled to the first clocking means, for counting gray levels;
   translating means, coupled to the first counting means, for translating an input gray level code including means for generating an output gray level code;
   first comparing means, coupled to the first storing means and to the translating means for comparing a gray level read from the first storing means to the current gray level count generated by the translating means including means for generating an output indicating substantial equality;
   means, coupled to the first comparing means, for accessing each reproduction element; and
   means for incrementing the first counting means after the addressing means has addressed a plurality of gray level codes in the first storing means.

8. The system according to claim 7, wherein the clocking means includes means for generating a series of edges having a uniform time difference between adjacent edges.

9. A gray level reproduction system having a plurality of reproduction elements comprising:
   first storing means for storing a plurality of gray level codes, each code corresponding to an area in a row to be printed;
   addressing means for addressing each gray level code in the first storing means;
   first clocking means, including means for generating a series of edges having a variable time difference between adjacent edges;

first counting means, coupled to the first clocking means, for counting gray levels;

translating means, coupled to the first counting means, for translating an input gray level code including means for generating an output gray level code;

first comparing means, coupled to the first storing means and to the translating means for comparing a gray level read from the first storing means to the current gray level count generated by the translating means including means for generating an output indicating substantial equality;

means, coupled to the first comparing means, for accessing each reproduction element; and means for incrementing the first counting means after the addressing means has addressed a plurality of gray level codes in the first storing means.

10. The system according to claim 1, wherein the means for generating a series of rising edges having a variable time difference between adjacent edges includes an interval memory having an address input coupled to the output of the translating means including means for generating a first interval count;

second clocking means for generating a clock having a uniform time difference between adjacent rising edges;

second counting means, coupled to the second clocking means, including means for generating a second interval count;

second comparing means, coupled to the interval memory and to the second counting means, for comparing the output of the interval memory to the output of the second counting means including means for generating a signal indicating that the first interval count is equal to the second interval count.

11. The apparatus according to claim 10, wherein the reproduction element includes a light generating element.

12. The apparatus according to claim 10, wherein the reproduction element includes a means for directly depositing toner by direct electrostatic deposition.

13. The apparatus according to claim 10, wherein the system further includes means, coupled to the first comparing means, for generating a voltage ramp, and the reproduction element includes means, coupled to the voltage ramp generating means, for directly depositing toner by direct electrostatic deposition.

14. An apparatus for converting a code word capable of assuming a plurality of values into a pulse width modulated signal comprising:

code word storage means for storing a code word value;

a code counter having a clock input;

a code comparator, coupled to the code word storage means and to the code counter, for generating a signal indicating when the code number counter has a value less that the code word value;

interval storage means, addressed by the code counter, having at least one location corresponding to each code word value and generating an interval output;

an interval counter;

an interval comparator, coupled to the interval storage means and to the interval counter, for generating a clock signal indicating when the interval counter is equal to the interval output, wherein the clock input of the code counter is coupled to the clock signal generated by the interval comparator.

15. A gray level reproduction system having a plurality of reproduction elements, each having a control input, for directly depositing toner by direct electrostatic deposition comprising:

first storing means for storing a plurality of gray level codes, each code corresponding to an area in a row to be printed;

addressing means for addressing each gray level code in the first storing means;

first clocking means;

first counting means, coupled to the first clocking means, for counting gray levels;

first comparing means, coupled to the first storing means and to the first counting means for comparing a gray level read from the first storing means to the current gray level count generated by the first counting means including means for generating an output indicating equality;

means, coupled to the first comparing means, for accessing each reproduction element;

means for incrementing the first counting means after the addressing means has addressed a plurality of gray level codes in the first storing means; and means for compensating for relative differences between the reproduction elements for directly depositing including means for introducing a variable time delay in the response of each reproduction element to its control input, the means for introducing a variable time delay including a plurality of second counting means, wherein each reproduction element is responsive to a respective one of the second counting means.

16. A gray level reproduction system having a plurality of reproduction elements, each having a control input, comprising:

first storing means for storing a plurality of gray level codes, each code corresponding to an area in a row to be printed;

addressing means for addressing each gray level code in the first storing means;

first clocking means;

first counting means, coupled to the first clocking means, for counting gray levels;

first comparing means, coupled to the first storing means and to the first counting means, for comparing a gray level read from the first storing means to the current gray level count generated by the first counting means including means for generating an output indicating equality;

means, coupled to the first comparing means, for accessing each reproduction element;

means for incrementing the first counting means after the addressing means has addressed a plurality of gray level codes in the first storing means;

means for compensating for relative differences between the reproduction elements including means for introducing a variable time delay in a response of each reproduction element to its control input, the means for introducing a variable time delay including a plurality of second counting means, wherein each reproduction element is responsive to a respective one of the second counting means.

17. In a gray level reproduction system having a plurality of reproduction elements, and a first storing means, a method of controlling the reproduction elements, comprising the steps of storing a plurality of gray level codes into the first storing means, each code corresponding to an area in a row to be printed;

addressing each gray level code in the first storing means;

generating a first clocking signal by having a series of edges having a variable time difference between adjacent edges;

counting gray level in response to first clocking signal;

comparing a gray level read from the first storing means to the current gray level count counted in response first clock signal;

accessing each reproduction element; and executing the counting step after the addressing step has addressed a plurality of gray level codes in the storing means.

18. The method according to claim 17, wherein the step of generating a series of edges having a variable time difference between adjacent edges includes the substeps of generating a first interval count in response to the counting step;

generating a second clock signal having a uniform time difference between adjacent rising edges;

generating a second interval count in response to the step of generating a second clock signal; and a second comparing step of comparing the first interval count with the second interval count.

19. A gray level reproduction system having a plurality of elements for directly depositing toner by direct electrostatic deposition comprising:

first storing means for storing a plurality of gray level codes, each code corresponding to an area in a row to be printed;

addressing means for addressing each gray level code in the first storing means;

first clocking means including means for generating a series of edges having a variable time difference between adjacent edges;

first counting means, coupled to the first clocking means, for counting gray levels;

first comparing means, coupled to the first storing means and to the first counting means for comparing a gray level read from the first storing means to the current gray level count generated by the first counting means including means for generating an output indicating equality;

means, coupled to the first comparing means, for accessing each reproduction element;

means for incrementing the first counting means after the addressing means has addressed a plurality of gray level codes in the first storing means; and means for compensating for relative differences between the elements for directly depositing including means for introducing a variable time delay, in response to mechanical motion in the elements for directly depositing, in the response of each element to a control input.

20. The system according to claim 19, wherein the first clocking means includes means for generating a series of edges having a variable time difference between adjacent edges.

21. A gray level reproduction system having a plurality of elements for directly depositing toner by direct electrostatic deposition comprising:

first storing means for storing a plurality of gray level codes, each code corresponding to an area in a row to be printed;

addressing means for addressing each gray level code in the first storing means;

first clocking means including means for generating a series of edges having a variable time difference between adjacent edges;

first counting means, coupled to the first clocking means, for counting gray levels;

first comparing means, coupled to the first storing means and to the first counting means for comparing a gray level read from the first storing means to the current gray level count generated by the first counting means including means for generating an output indicating equality;

means, coupled to the first comparing means, for accessing each reproduction element;

means for incrementing the first counting means after the addressing means has addressed a plurality of gray level codes in the first storing means; and means for compensating for relative differences between the elements for directly depositing including means for introducing a variable time delay in the response of each element to a control input, the means for introducing a variable delay including means for detecting an angular displacement of a mechanical element of the means for directly depositing; and means, coupled to the means for detecting an angular displacement, for introducing a variable time delay in accordance with the angular displacement of the mechanical element.

22. The system according to claim 21, wherein the first clocking means includes means for generating a series of edges having a variable time difference between adjacent edges.

23. A gray level reproduction system comprising:

first storing means for storing a plurality of gray level codes, each of the codes corresponding to an area in a row to be printed;

addressing means for addressing each gray level code in the first storing means;

first clocking means;

first counting means, coupled to the first clocking means, for counting gray levels;

first comparing means, coupled to the first storing means and to the first counting means, for comparing a gray level read from the first storing means to the current gray level count generated by the first counting means the first comparing means including means for generating an output indicating equality;

means for depositing toner by direct electrostatic deposition and including a plurality of deposition elements each having a control input;

means, coupled to the first comparing means, for accessing each deposition element, the accessing means including means for applying a pulse having one of a plurality of pulse widths to one of the control inputs, the widths of the pulses being selected such that the optical density of the area in the row will be a monotonically increasing function of the value of the gray level code; and means for incrementing the first counting means after the addressing means has addressed a plurality of gray level codes in the first storing means.

24. A gray level reproduction system having a rotatable toner delivery roll and a plurality of elements for directly depositing toner by direct electrostatic deposition comprising:

first storing means for storing a plurality of gray level codes, each code corresponding to an area in a row to be printed;

addressing means for addressing each gray level code in the first storing means;

first clocking means including means for generating a series of edges having a variable time difference between adjacent edges;

first counting means, coupled to the first clocking means, for counting gray levels;

first comparing means, coupled to the first storing means and to the first counting means for comparing a gray level read from the first storing means to the current gray level count generated by the first counting means including means for generating an output indicating equality;

means, coupled to the first comparing means, for accessing each reproduction element;

means for incrementing the first counting means after the addressing means has addressed a plurality of gray level codes in the first storing means; and means for compensating for relative differences between the elements for directly depositing including means for introducing a variable time delay in the response of each element to a control input, the means for introducing a variable time delay including means for detecting the angular displacements of the rotatable toner delivery roll, memory means, having an address input coupled to the means for detecting an angular displacement, including means for generating an output data word, and means for counting down, having a data input coupled to means for generating an output data word, and having a clock input coupled to a clock having a higher frequency than a frequency of the first clocking means.

25. A gray level reproduction system having a plurality of reproduction elements, each having a control input, comprising:

first storing means for storing a plurality of gray level codes, each code corresponding to an area in a row to be printed;

addressing means for addressing each gray level code in the first storing means;

first clocking means;

first counting means, coupled to the first clocking means, for counting gray levels;

first comparing means, coupled to the first storing means and to the first counting means, for comparing a gray level read from the first storing means to the current gray level count generated by the first counting means including means for generating an output indicating equality;

means, coupled to the first comparing means, for accessing each reproduction element;

means for incrementing the first counting means after the addressing means has addressed a plurality of gray level codes in the first storing means;

means for compensating for relative differences between the reproduction elements including means for introducing a variable time delay in the response of each element to its control input, the means for introducing a variable delay including means for introducing a variable time delay in response to mechanical motion in the reproduction elements.

26. A gray level reproduction system having a plurality of reproduction elements, each having a control input, comprising:

first storing means for storing a plurality of gray level codes, each code corresponding to an area in a row to be printed;

addressing means for addressing each gray level code in the first storing means;

first clocking means;

first counting means, coupled to the first clocking means, for counting gray levels;

first comparing means, coupled to the first storing means and to the first counting means, for comparing a gray level read from the first storing means to the current gray level count generated by the first counting means including means for generating an output indicating equality;

means, coupled to the first comparing means, for accessing each reproduction element;

means for incrementing the first counting means after the addressing means has addressed a plurality of gray level codes in the first storing means;

means for compensating for relative differences between the reproduction elements including means for introducing a variable time delay in the response of each element to its control input, the means for introducing a variable delay including means for detecting an angular displacement of a mechanical element of the reproduction; and means, coupled to the means for detecting an angular displacement, for introducing a variable time delay in accordance with the angular displacement of the mechanical element.

27. A gray level reproduction system having a plurality of reproduction elements, each having a control input, comprising:

first storing means for storing a plurality of gray level codes, each code corresponding to an area in a row to be printed;

addressing means for addressing each gray level code in the first storing means;

first clocking means;

first counting means, coupled to the first clocking means, for counting gray levels;

first comparing means, coupled to the first storing means and to the first counting means, for comparing a gray level read from the first storing means to the current gray level count generated by the first counting means including means for generating an output indicating equality;

means, coupled to the first comparing means, for accessing each reproduction element;

means for incrementing the first counting means after the addressing means has addressed a plurality of gray level codes in the first storing means;

means for compensating for relative differences between the reproduction elements including means for introducing a variable time delay in the response of each element to its control input, the means for introducing a variable delay including means for detecting an angular displacement of a mechanical element;

memory means, having an address input coupled to the means for detecting an angular displacement, including means for generating an output data word;

means for counting down, having a data input coupled to means for generating an output data word, and having a clock input coupled to a clock having a higher frequency than a frequency of the first clocking means.

28. A gray level reproduction system comprising:
a moving part;
means for depositing toner by direct electrostatic deposition, including
   a plurality of deposition elements each having a control input, each deposition element corresponding to an area of an image to be reproduced,
   means for detecting angular displacements of the moving part, and
   memory means, having an address input coupled to the means for detecting an angular displacement, the memory means including means for generating an output data word; and
means for accessing each deposition element, the accessing means including means for applying a pulse having one of a plurality of pulse widths to one of the control inputs, the widths of the pulses being selected such that an optical density of the corresponding area of the image will be a monotonically increasing function of the width of the applied pulse.

29. A gray level reproduction system comprising:
means for depositing toner by direct electrostatic deposition, including
   a plurality of deposition elements each having a control input, each deposition element corresponding to an area of an image to be reproduced,
   a rotatable toner delivery roll,
   means for introducing a variable time delay in the response of each deposition element to its control input, including means for detecting angular displacements of the rotatable toner delivery roll, and
   memory means, having an address input coupled to the means for detecting an angular displacement, including means for generating an output data word; and
means for accessing each deposition element, the accessing means including means for applying a pulse having one of a plurality of pulse widths to one of the control inputs, the widths of the pulses being selected such that an optical density of the corresponding area of the image will be monotonically increasing function of the width of the applied pulse.

* * * * *